United States Patent Office 3,451,394
Patented June 24, 1969

3,451,394
RADIATING TANNED AND UNTANNED COLLAGEN PROSTHESIS WITH 5 TO 25 MEGARADS OF IONIZING RADIATION
Lavon Dee Bechtol, Far Hills, and Charles Artandi, Highland Park, N.J., assignors to Ethicon, Inc., a corporation of New Jersey
No Drawing. Filed Apr. 4, 1961, Ser. No. 100,522
Int. Cl. A61l 5/00
U.S. Cl. 128—296         5 Claims This invention relates to collagen products and more particularly to the in vivo absorption of collagen in the human body.

In the practice of surgery, collagen sutures are widely used to sew together tissues, nerves, or blood vessels because collagen is the only completely and readily absorbable suture material. Collagen sutures are absorbed or digested during the healing process by the tissues, in which they are imbedded. Their function is to serve as either a suture or a ligature until such time as body repair has progressed to the point where they are no longer needed. Collagen sponges are also used in surgery and may be left in the body cavity, as the collagen sponge is slowly absorbed by the surrounding tissues.

Although collagen for many years has been the material of choice because of its properties of absorbability and lack of tissue irritation, little is known concerning the complex reactions that take place when an absorbed suture is buried in the tissues. It has long been known that the in vivo rate of absorption of collagen may be decreased by tanning, but attempts to increase the rate of absorption left much to be desired because the collagen was degraded to the point that tensile strength was unsatisfactory.

It is an object of this invention, therefore, to control the in vivo rate of absorption of collagen.

It is another object of the present invention to provide the surgeon with collagen structures such as collagen sutures and collagen sponges that have a definite rate of absorption and do not cause an undue amount of tissue irritations.

It has now been discovered that the in vivo rate of absorption of collagen sutures may be increased by exposing the collagen to heavy doses of ionizing radiation such as alpha, beta, or gamma rays, protons, neutrons, etc. A preferred source of ionizing radiation is the electron beam. Thus, the absorbability of the collagen can be accurately controlled by varying the degree of tanning and the amount of irradiation.

In general, it has been observed that increasing the irradiation dose increases the rate at which collagen is absorbed and also lowers the tissue reaction. As might be expected, tanning the collagen suture with formaldehyde decreases the rate of absorption. However, the effect of tanning is eliminated by high irradiation doses. By the selection of irradiation dose, it is possible to produce collagen sponges and sutures of definite absorption characteristics for specific surgical needs.

A convenient unit for measuring the amount of radiation energy absorbed is the rad, which may be defined as an amount of radiation that is equivalent to 100 ergs per gram. The megarad is equivalent to one million rads. The irradiation of collagen at levels greater than about 5 megarads very definitely increases its rate of in vivo absorption and decreases its tensile strength. Irradiated collagen sutures will lose approximately 10% of their tensile strength for each 5 megarads of radiation received. At 20 to 25 megarads of radiation the rate of absorption is about the same for both tanned and untanned collagen.

The following are specific examples illustrating different methods of carrying out the present invention.

EXAMPLE I

A collagen sponge is prepared as will be described from the deep flexor tendon of cattle. The tendon is sliced perpendicularly to its longitudinal axis to a thickness of about 11 mils and treated with an enzyme solution to dissolve elastin. The enzyme solution is prepared by dissolving 0.15 part of ficin and 3.75 parts of ethylene diamine tetrasodium tetraacetate in 750 parts of water. Seventy-five parts of the sliced tendon is immersed in this solution which is stored at room temperature overnight. Then 2.25 parts of 30% hydrogen peroxide is added to destroy any residual ficin.

To this mixture of tendon slices in about 750 parts of water is added an additional 2244 parts of water and 5.87 parts of cyanocacetic acid. The swelling solution is cooled to below 25° C. and this mixture is stirred in a dispersion kettle at about 60 r.p.m.

Stirring is continued for about 3 hours, during which time the individual collagen slices are swollen. The dispersion is then homogenized by repeated passes through series-connected jets having orifices of 50 mils and 40 mils, respectively. The dispersion is then forced through a leaf filter containing three screens of #316 stainless steel. These screens are separated by ⅛-inch spacers and decrease in mesh size so that the dispersion first passes a 14-mil screen, then a 9-mil screen, and finally a 4-mil screen. The dispersion of solvated collagen fibrils so obtained analyzes 0.80% solids and has a pH of 2.52.

The above collagen dispersion is poured into stainless steel forms and frozen in a sub-zero cabinet at −20° C. overnight. The frozen blocks are then removed from the container and immersed in a circulating bath containing 12 liters of 99% isopropanol and 25 milliliters of concentrated ammonium hydroxide at room temperature. After approximately four hours, the isopropanol solution is replaced with 12 liters of a fresh solution and the dehydration is continued overnight at room temperature. The isopropanol solution containing the water extracted is removed and a third bath of 99% isopropanol is used in the further dehydration of the collagen. The third bath is replaced in turn with a fourth bath having the same composition; the dehydrating time amounting to 6 to 8 hours in both the third and fourth baths. At this time, the collagen is in the form of a sponge that is practically free of water. The sponges may be air dried in an oven at 50° C. overnight without damage.

The sponges so obtained are cut to form cubes about 1 centimeter on each side and these sponges are exposed to varying amounts of ionizing radiation (from about 5 megarads to about 25 megarads). Implants of these irradiated sponges are made under ether anesthesia subcutaneously in albino male rats weighing between 200 and 300 grams. At appropriate intervals, the animals are sacrificed by overdosage with sodium pentobarbital and the implant is removed for observation of tissue reaction and absorption.

*Sponges receiving 5 megarads of irradiation.*—Tissue reaction observed at 5 days postimplantation reveals a marked reaction. At 10 days after implantation the reaction is reduced to a moderate degree. From the 15th day to the 35th day the reactions are further reduced to one of a slight order of magnitude. The sponges begin to absorb by the 15th day postoperatively and show a 70 percent absorption in 35 days.

*Sponges receiving 10 megarads of irradiation.*—These sponges show at 5 days postoperatively a moderate degree of tissue reaction. At 10 to 15 days postimplantation a slight degree of tissue irritation is noted. Normal tissue and complete absorption of the sponge occurs at 20 days after implantation of the sample.

*Sponges receiving 15 megarads of irradiation.*—Five to ten days after implantation the sponge has effected a slight degree of tissue irritability. Normal tissue and complete absorption of the sponges occur by the 15th day.

*Sponges receiving 20 megarads of irradiation.*—These sponges have a similar tissue reaction to those that receive 15 megarads of irradiation. Normal tissue and complete absorption likewise occur in 15 days.

*Sponges receiving 25 megarads of irradiation.*—A slight tissue reaction is noted after implantation of these sponges for 5 days. Normal tissue and complete absorption of the samples is noted by the 10th day.

EXAMPLE II

Tanned sponges are prepared by the method described in Example I by adding to the first dehydrating bath containing 25 milliliters of concentrated ammonium hydroxide in 12 liters of 99% isopropanol, 100 milliliters of 37% formalin. In all other respects the procedure for preparing the tanned sponges is identical to that described in Example I above.

The tanned sponges so obtained are cut to form cubes about 1 centimeter on each side and these sponges are exposed to varying amounts of ionizing irradiation (from about 5 megarads to about 25 megarads). Implants of these irradiated sponges are made under ether anesthesia subcutaneously in albino male rats weighing between 200 and 300 grams. At appropriate intervals, the animals are sacrificed by overdosage with sodium pentobarbital and the implant is removed for observation of tissue reaction and absorption.

*Sponges receiving 5 megarads of irradiation.*—Tissue reaction observed 5 days after implantation shows the sponge to have a marked tissue irritability. At 10 days it decreases to a moderate degree. From the 15th to the 35th day the tissue irritation subsides to a slight degree. Absorption begins to occur at 15 days postimplantation and reaches 70 percent by the 35th day.

*Sponges receiving 10 megarads of irradiation.*—These sponges show a marked tissue reaction at 5 days postoperatively. Reduction of reaction to a moderate degree by the 10th day. This sample further reduces in reaction by the 15th day to a slight degree, remaining so until the 35th day when normal tissue is observed. Complete absorption of the sample occurs by the 35th day.

*Sponges receiving 15 megarads of irradiation.*—Tissue acceptability of these sponges demonstrates a slight order of magnitude from the 5th to the 20th day postimplantation. Normal tissue and complete absorption of the samples is noted by the 25th day.

*Sponges receiving 20 megarads of irradiation.*—When observed at 5 to 10 days after implantation these sponges show a slight degree of tissue reaction. Normal tissue and complete absorption of the sample is observed by the 15th day.

*Sponges receiving 25 megarads of irradiation.*—A slight tissue reaction is observed after implantation of these sponges for 5 days. Normal tissue and complete absorption of the samples is noted by the 10th day.

EXAMPLE III

Male albino rats weighing between 150–250 grams are used to determine the effect of irradiation on collagen sutures. Implants of irradiated suture strands (7 cm. in length) are made under ether anesthesia subcutaneously for straight tensile strength survival.

Various numbers of animals are employed at each point on the tensile strength-time curve, each bearing five strands of each of two samples. These strands are placed with hemostatic forceps through a small incision in the skin of the back. The skin wound is then closed with Michel wound clips.

The animals are sacrificed at stated intervals by overdosage with sodium pentobarbital, and the implants removed for tensile strength determination. Tensile strength of subcutaneously implanted sutures is determined 1, 2, 3, 4, 5, 7, and 10 days after implantation. These results are summarized in the following table. Increased dosages of radiation hastens tensile strength loss. Irradiation levels of $15 \times 10^6$ rads causes the suture to become completely absorbed in 3 days. Increasing the level to $25 \times 10^6$ rads causes the suture to be completely absorbed in 1 day.

TABLE I

| Days P.I. | None | 5 megarads | 10 megarads | 15 megarads | 25 megarads |
|---|---|---|---|---|---|
| 0 | 3.06 | 2.93 | 2.13 | 1.65 | 1.78 |
| 1 | 2.08 | 1.90 | 0.90 | 0.08 | C.A. |
| 2 | 1.81 | 1.60 | 0.74 | 0.04 | C.A. |
| 3 | 1.54 | 1.35 | 0.25 | C.A. | C.A. |
| 4 | 1.35 | 1.20 | 0.51 | C.A. | C.A. |
| 5 | 1.12 | 0.98 | 0.05 | C.A. | C.A. |
| 7 | 1.46 | 0.86 | 0 | C.A. | C.A. |
| 10 | 0.76 | 0.20 | 0 | C.A. | C.A. |

NOTE.—C.A. means complete absorption.

What is claimed is:
1. A method of producing a collagen prosthesis selected from the group consisting of collagen sutures and collagen sponges, said collagen prosthesis being characterized by specific absorption characteristics, which comprises the steps of:
   tanning the collagen prosthesis; and,
   exposing the tanned collagen prosthesis to form 5 to 25 megarads of ionizing radiation.
2. A method of producing a collagen suture of specific absorption characteristics which comprises the steps of:
   tanning a collagen suture; and,
   exposing the tanned collagen suture to from 5 to 25 megarads of ionizing radiation.
3. The method of producing a collagen sponge of specific absorption characteristics which comprises the steps of:
   freezing a dispersion of solvated collagen fibrils to form a solid frozen block;
   drying the solid frozen block by immersing the same in an alkaline water-soluble organic solvent to form a sponge;
   air-drying the sponge; and,
   exposing the air-dried sponge to from 5 to 25 megarads of ionizing radiation.
4. A method of producing a collagen sponge having specific absorption characteristics which comprises the steps of:
   freezing a dispersion of solvated collagen fibrils to form a solid frozen block;
   drying the solid frozen block by immersing the same in water-soluble organic solvent containing a tanning agent to form a sponge;
   air-drying the sponge; and
   exposing the air-dried sponge to from 5 to 25 megarads of ionizing radiation.
5. An irradiated collagen prosthesis selected from the group consisting of collagen sutures and collagen sponges, said prosthesis being characterized by specific absorption characteristics and prepared by the method of claim 1.

(References on following page)

References Cited

UNITED STATES PATENTS

| | | | |
|---|---|---|---|
| 2,465,357 | 3/1949 | Correll | 128—296 X |
| 2,637,321 | 5/1953 | Cresswell | 128—335.5 |
| 3,046,210 | 7/1962 | Lowry | 204—154 |
| 2,610,625 | 9/1952 | Sifferd et al. | 128—296 |
| 2,721,941 | 10/1955 | McMaster | 250—421 |
| 3,157,524 | 11/1964 | Artandi | 128—296 X |
| 2,937,279 | 5/1960 | Artandi | 250—83 |
| 3,043,067 | 7/1962 | Rynkiewicz | 53—27 |

OTHER REFERENCES

"Factors Affecting Metabolism of Muscle Collage," item 15029 relied on, September 1959.

"Alteration of Collagen Structure by Irradiation With Electrons," Nature, pages 863 and 864 relied on, Nov. 19, 1950.

"Gamma Irradiation of Collagen," Symposium on Chemical Effects of High Energy Radiation, Dec. 28, 1958, page 8 relied on.

"Effects of Whole Body X-Irradiation on Wound Healing," Collagen Currents, vol. 1, No. 5, November 1960, pages 27 and 28 relied on.

Cassel: Journal Amer. Leather Chemists Assoc., vol. 54 (1959), pp. 432–51.

Kraissl: Surgery, Gynecology and Obstetrics, Int. Abstract of Surgery, May 1936, page 419.

Weiss: Surgery, Gynecology and Obstetrics, vol. 98, No. 2, pages 241–246, 8–94 (February 1954).

Ephrati: Biochem. J., 1948, pages 383–389.

Bowes et al.: Radiation Research, 16, 211–223 (1962).

Brownell et al.: The Sterilization of Medical Supplies With Gamma Radiation, Peaceful Uses of Atomic Energy, 1956, vol. 15, United Nations Publication, pages 258–264 are relied on.

DONALD LEVY, *Primary Examiner.*

U.S. Cl. X.R.

8—94.11, 127.5; 106—122, 155; 117—93.3, 141; 128—335.5; 250—49.5, 51, 106